United States Patent [19]
Lambert et al.

[11] 3,765,829

[45] Oct. 16, 1973

[54] COLOURABLE POLYOLEFIN COMPOSITIONS

[75] Inventors: Bernard Lambert, Lens; Adrien Nicco, Bethune, both of France

[73] Assignee: Societe Anonyme dite: Ethylene Plastique, Courbevoie, France

[22] Filed: Dec. 7, 1970

[21] Appl. No.: 95,973

[30] Foreign Application Priority Data
Dec. 9, 1969 France .................. 6942592

[52] U.S. Cl. ................ 8/4, 8/163, 8/168, 8/180, 260/41 C, 260/897 B
[51] Int. Cl. .................. C08f 29/10, D06p 3/00
[58] Field of Search .......... 8/DIG. 9, 4, 163, 8/168, 180; 260/897 B, 41 C

[56] References Cited
UNITED STATES PATENTS

| | | | |
|---|---|---|---|
| 3,320,226 | 5/1967 | Cappuccio et al. | 8/168 |
| 3,388,190 | 6/1968 | Bryant et al. | 260/897 B |
| 3,127,234 | 3/1964 | O'Neill | 8/DIG. 9 |
| 3,156,745 | 11/1964 | Behrenbruch et al. | 260/897 B |
| 3,284,380 | 11/1966 | Davis | 260/897 B |
| 3,422,055 | 1/1969 | Maloney | 260/897 B |

FOREIGN PATENTS OR APPLICATIONS

| | | | |
|---|---|---|---|
| 759,534 | 5/1967 | Canada | 260/897 R |
| 44/2563 | 2/1969 | Japan | 260/897 B |

*Primary Examiner*—Allan Lieberman
*Attorney*—Eyre Mann Lucas

[57] ABSTRACT

Polyolefin compositions are difficult to dye and a method is proposed which comprises incorporating 2 to 15 percent by weight of a statistical copolymer of ethylene and maleic anhydride. In a preferred form of the invention the polymer composition is subjected to amination with one of the various kinds of polyamine. The polymer compositions so produced contain reactive sites which considerably facilitate the process of dyeing of these polymers. The dyed polymer compositions have excellent properties and can be spun and otherwise processed readily.

14 Claims, No Drawings

COLOURABLE POLYOLEFIN COMPOSITIONS

The present invention relates to colourable polyolefin compositions, that is to say compositions which are capable of being dyed, being fixed and of retaining the dyes.

Polyolefins, such as polyethylenes and polypropylene, have considerable inertness from the chemical standpoint. This property, which is of interest for numerous applications of these polymeric materials, has however the result that these polyolefins are very difficult to dye by means of known dyes, due to the fact that there is no chemical affinity between the dyes and the polymers. Consequently, when the polyolefin or a formulation containing it is subjected to a dyeing treatment, no or only irregular penetration of the dyes occurs and there is insufficient "binding" of these dyes on these polymers.

On the other hand, it is known that the dyeing of these polyolefins with the aid of the usual dyes can be facilitated by mixing the polyolefins with a reactive polymeric or non-polymeric compound having an affinity for the dyes.

It has been proposed to add maleic anhydride to the polyolefin which is to be dyed, but this reagent is only very slightly compatible with polyolefins and, in the conditions under which these materials are used, for example, when drawing out the fibres by extrusion, separation and sublimation of the anhydride occurs.

Moreover, it has been proposed to create reactive loci in a polyolefin by grafting on maleic anhydride, but this grafting operation is difficult and onerous and, in this case, there is an irregular fixation of the anhydride groups. The thus-modified polyolefin to be dyed does not produce such regular and fine fibres as the non-modified polyolefin, no doubt due to its imperfect homogeneity. The fibres obtained have diminished and very unequal mechanical properties and do not fix the dye in an even manner.

It has equally been proposed to incorporate, in the polyolefin which is to be dyed, a copolymer of ethylene and an unsaturated ester, e.g. ethyl maleate or ethyl acrylate, and to modify the reactive copolymer by transesterification by means of an N,N-substituted aminoalcohol. This process has given rise to appreciable progress, but its use is troublesome and hardly convenient, because the transesterification reaction is difficult to carry out and also requires a lot of time and an elevated temperature. Moreover, the reactivity of the modified product as regards the dyes remains low.

Thus the compound, preferably a polymeric compound, which will be used in admixture with the polyolefin ought to possess at the same time very varied properties, such as a very good compatibility with polyolefins, a high thermal stability during mixing, in order to obtain a good homogeneous mixture, and the largest possible affinity for the various types of known dyes. Furthermore, the polymeric compound added to the polyolefin should not impair the mechanical properties of various articles, such as films, tapes or fibres, which can be manufactured from the polyolefin.

The invention relates to new compositions which are mixtures suitable for fixing dyes and which comprise (A) at least one polyolefin and from 2 to 15 percent, by weight of the polyolefin, of (B) a copolymer of ethylene and maleic anhydride of a grade in the range from 1 to 1,000, preferably 1 to 100, the mixture containing 0.1 to 1.5 percent b.w., preferably 0.5 to 1.0 percent, of anhydride groups derived from the copolymer (B).

The polyolefins (A) concerned by this treatment are:

a. preferably, the crystalline and semi-crystalline polyolefins, such as high and low pressure polyethylenes, polypropylene, polybutene, poly-4-methylpentene and analogous homopolymers and copolymers modified by another α-olefin in a minor proportion for example below 15 percent b.w.; or, b. a homogeneous mixture of one of the above polyolefins with at least one other of these polyolefins, for example, a mixture of polypropylene and polyethylene, or at least one amorphous polyolefin or olefin copolymer, such as ethylene-propylene rubber or polyisobutylene.

The copolymers (B) are statistical copolymers obtained in an agitated autoclave reactor, by the free radical route, according to the so-called "high-pressure" process, starting from ethylene and maleic anhydride containing at least 15 percent b.w. of groups derived from the maleic anhydride.

The grades are measured according to ASTM 1238-65T at a temperature of 190°C. with a load of 2,160 kg, except however for the polypropylenes and poly-4-methylpentenes, for which a temperature of 230°C. and a load of 5 kg are used.

The maleic anhydride/ethylene copolymers used in the invention are copolymers of an apparently statistical structure.

In effect, if it is divided into fractions of increasing molecular weight (for example with the decalin-acetylacetone precipitant solvent system) having an intrinsic viscosity ranging from 0.2 to 1.4, it is found that the fractions representing 80 to 90 percent of the polymer mass have only slightly varying maleic anhydride contents, in the range from 0.7 to 1.4 times the total amount of maleic anhydride in the copolymer.

They have a crystallinity and mechanical properties like those of the polyethylene homopolymers. Their crystalline melting point is in the range from 80° to 110°C. Like the polyethylenes, they are insoluble in organic solvents, e.g., benzene, acetone, alcohols, esters and phenols. They do not include gels and have an excellent resistance to oxidation.

On the contrary, the copolymers obtained by grafting, by reason of the grafting mechanism which is undertaken by a free radical process, have a proportion of molecules with long ramified chains, and more or less reticulated gels which alter the properties thereof. Thus in this way for example, their mechanical properties, elasticity and extrudability are reduced. Moreover, these resins are less resistant to oxidising and ageing agents.

The percentage of anhydride groups in the copolymer (B) is preferably in the range from 4 to 15 percent b.w. For copolymers having percentages lower than 4 percent of maleic anhydride, it is necessary to include a large quantity thereof in the polyolefin, in order to obtain a good aptitude to dyeing, and the mechanical properties of the product obtained are notably reduced. For percentages higher than 15 percent, it will be seen that it becomes difficult to incorporate the copolymer, the compatibility of which seems to be insufficient.

The grade (flow index) of the copolymer used is chosen so as to allow ready incorporation in the polyolefin. It is preferred to use grades which are higher than that of the polyolefin to be modified and higher than 1 dg/mn in general.

Fairly high grades can be used, but is usually undesirable to use copolymers of a grade higher than 1,000; the polyolefin fibres obtained have reduced mechanical properties and the solidity of the dye in solvents and during washing is not so good.

The mixtures according to the invention are homogenised by melting and mixing. They are stable and capable of being dyed by means of the known basic dyes.

However, it is of apparent interest to be able to dye the polyolefins with known dyes other than basic dyes, namely, either with non-ionic dyes soluble in water, such as acid wool dyes, as well as the metallizable, metalliferous and reactive dyes, or with dispersible, metalliferous or water-insoluble dyes which are soluble in polyolefins, such as the special dyes used for acetate, nylon, polyesters or other synthetic textiles.

In order to do this, it has been found that the copolymer (B) of ethylene and maleic anhydride used according to the invention must undergo a topochemical amination reaction with a polyamine having at least two amino groups, at least one of which is primary. The polyamines listed below are indicated by way of example, but the list is not restrictive.

a. diethylenetriamine, triethylenetetramine and tetrethylenepentamine are preferred, because their results are very superior;

b. ethylenediamine, trimethylenediamine, hexamethylenediamine and polyethylene-imines having molecular weight of 200 to 40,000 give quite good results.

It is equally possible to use compounds such as hydrazine, aminoethyl-piperazine, N,N-dimethylethylenediamine, 2-amino-pyrimidine, 3-amino-1,2,4-triazole and 4-aminoethylpyridine, but they give less favourable results.

This transformation is carried out according to any one of the following three methods:

a. either on the copolymer (B) before it is mixed with the polyolefin, subject to this amination not leading to a recticulated (cross-linked) copolymer;

b. on the mixture (A-B) of the copolymer (B) and the polyolefin (A) and preferably immediately after homogenisation;

c. finally, on the finished article (e.g. film or monofil) obtained from the mixture of copolymer and polyolefin.

In the first case, in order to avoid reticulation, it is preferable to use polyamines having a single primary amine group, in a sufficient quantity that at least 80 percent and preferably at least 90 percent of the anhydride groups are transformed into amides. This reaction can be carried out either on the molten copolymer in an internal mixer, preferably under an inert atmosphere, or by soaking the copolymer, in powdered or granulated form, either in the amine or, preferably, in a solution of the amine in an organic solvent which produces swelling of the copolymer, if ordinary or slightly raised temperatures are used, or solubilisation thereof, if high temperatures are used. Solvents which can be used are, for example, cycloalkyl, aryl or alkaryl hydrocarbons, with or without halogen substituents, for example, cyclohexane, xylene, tetrahydronaphthalene, decahydronaphthalene, benzene, toluene and mono-, di-, and trichlorobenzene. The thus-modified copolymer (B) is then mixed with the polyolefin (A) in the molten state so that the amount of nitrogen in the mixture (A-B) is from 0.10 to 2 percent b.w., preferably 0.25 to 1 percent.

In the second case, where the amination reaction is carried out on the mixture A-B before its final processing, the modification should preferably not produce more reticulation. The amines used are the same as above and are introduced under the same conditions, either in the pure state, by mixing or in solution in an organic solvent, by immersion of the mixture in the solution or an aqueous emulsion of the solution.

An amination bath with a polyamine percentage in the range from 0.2 to 20 percent b.w. is preferably used. When using the solvent in an aqueous solution, the swelling solvent is selected for example from those solvents mentioned above in the first case and is preferably used in an amount from 0.2 to 20 percent b.w. in the emulsion.

However, if the weight percentage of maleic anhydride in the mixture (A-B) is less than 0.2 percent, it is possible to use polyamines having two primary amine groups, the small increase which arises in this case (after mixing with the diamine or treatment by immersion of the granules of the mixture in a solution of the diamine in a medium which swells the modified polyolefin) hardly affecting the flow index of the mixture, which remains extrudable in filaments.

In the third case, where treatment is carried out on a finished article produced with the mixture A-B, the amination reaction is preferably performed with polyamines having at least two primary amine groups. In order to facilitate penetration of the reactants into the mixture, the article to be treated is immersed in a solution of amine, the solvents used being the same as above. The treatment bath can also be made up of an aqueous emulsion of the amine solution in the swelling solvent, in the presence of a suitable surfactant.

As in the second case, the residence time in the amination bath can be reduced to a few seconds by wiping and then finally drying the fibres for a time varying between 3 and 1,000 seconds in a drying cupboard in an inert atmosphere at a temperature in the range from 50° to 130°C. The amount of nitrogen in the treated mixture will be in the range from 0.03 to 3 percent, preferably 0.25 to 2 percent b.w. of the mixture.

When using primary diamines, reticulation of the copolymer is obtained in the polyolefin involving insolubilisation of the polymeric substance which is reactive to the dye. During treatment at 200°C. in decalin of a polypropylene fibre thus modified, and dyed for example with one of the Geigy "Irgalane" dyes, only the polypropylene becomes soluble, whilst the dye remains fixed on the reticulated copolymer, which keeps its initial form of very intensely-coloured fibre. The reticulation is thus demonstrated and it can be ascertained that the dye is effectively affixed to the polymer by a chemical bond, which provides this fibre with a remarkable stability during washing and under solvent action, which is higher than that of the known polypropylenes which can be dyed.

The reticulation in the fibre results in a better resistance in the face of heat, solvents and in particular dry-cleaning, a better resistance to chafing as well as a better dimensional stability.

It may be mentioned that if the mixture of the polyolefin and the ethylene maleic anhydride copolymer contains less than 0.2 percent b.w. of maleic anhyride, the filaments remain soluble in boiling xylene.

The polyamines used according to the invention, in relation to other possible reactants, have the advantage of affording a high reactivity and provide the treated fibres with a remarkable affinity for the dyes.

The following list of dyes which can be used according to the invention is given by way of example only.

Metalliferous complex, I/II of Geigy
    Irgalane red 4 GL
    " yellow 2 RL
    " blue RL
    " violet 5 RL
    " claret 2 BLN
    " darkbrown 5 R
    " grey RL Metalliferous complex, I/II of CFMC
    Inochrome blue 2J
    " red 3J
    " orange JR
    " claret RJ Lower-coloured Geigy dyes
    Eriochrome blue SE
    " yellow A
    " red G
    " yellow GS
    " black T dispersed
    " orange 2 RLL Dispersed Geigy dyes
    Setacyl scarlet T-2G
    " blue P-4GS
    " yellow P-2GL
    " navy blue P-BR
    " brilliant red P-BL
    " setaron blue B-GL
    " yellow gold RL
    " brilliant red 4G Acid dyes with strong affinity, Geigy
    Polar red G
    Brilliant polar blue RAWL
    Polar yellow 5G Anthraquinone Acid dyes, CFMC
    Alizarin orange S paste
    Alizarin blue S paste Acid dyes of good affinity especially for nylons — Geigy
    Erionyl yellow E 2GLN
    Erionyl brilliant blue E FRL
    Erionyl red RL The dyeing methods recommended by the manufacturers for dyeing wool have been utilised. However the fibre is preferably subjected to a preconditioning process in a bath comprising a carrier (swelling agent). The most effective vehicles are found to be halogenated derivatives of benzene, particularly o-dichlorobenzene and 1,2,4-trichlorobenzene used in proportions of 2 to 15 g/l according to the intensity of the dye to be obtained. Except where stated otherwise, we have used an emulsion with 15g/l trichlorobenzene.

Dyeing with dispersed and metalliferous I/II acid dyes for wool

The dyeing bath consists of:
2% of dye
2% of 85% formic acid
2% Tinegal BAN
The bath ratio used is 20/1.

After 15 minutes at 40°C., the temperature was raised to the boiling point, which was maintained for 1 hour. The fibres were washed in hot water and then acetone.

Dyeing with metalliferous I/I dyes
The dyeing bath consisted of:
2% of dye
8% sulphuric acid, 66° B. used in relation to the weight of the fibre so as to obtain a pH in the range from 1.8 to 2;
0.5% Inochrome P salt (binding agent)
That bath ratio used is 25/1.

After 15 minutes at 40°C., the temperature was raised to boiling which was maintained for 1 hr. 30 minutes. The fibres were then washed in hot water containing 5 percent sodium acetate and then in acetone.

Dyeing with low chromatation dyes
The dyeing bath was composed of:
2% of dye
1% of 80% acetic acid
5% anhydrous sodium sulphate
2% Marlon A 375 (binding agent from Chemische Werke Hüls GmbH).

The material was immersed in the bath at 40°C. and, after 30 minutes, the temperature was raised to boiling, which was maintained for 1 hour. The fibres were then washed and immersed in a fixing bath comprising:
1% potassium bichromate
2% of 85% formic acid.

Boiling point was again maintained for 45 minutes. The fibres were then washed in hot water and then in acetone.

The following non-limitative examples illustrate the invention.

The colour-fastness values mentioned in these examples have been measured according to the E.C.E. code of l'Association pour l'Etude et la Publication des Methodes de Détermination des Solidités (12, rue d'Anjou, Paris 8), referred to below as AEPMDS, and numbered from 1 to 5 according to the grey scale for colour-fastness and washings, and from 1 to 8 according to the blue scale for eposure to sunlight.

EXAMPLE 1

4 g of a copolymer (B) of ethylene and maleic anhydride containing 6.6 percent b.w. of groups derived from the copolymerisation of the anhydride, were introduced at 180°C. into an internal mixer containing 100 g of polypropylene (A).

The melting indices were respectively 9.5 dg/mn for the copolymer (B) and 6 dg/mn for the polypropylene. The isotacticity index for the polypropylene was 95 percent.

Amination was carried out in a mixer by introducing polyethylene-imine in a proportion of 3 g per 100 g of the mixture. The initial polypropylene whose melting index was 6 dg/mn had been extruded into fibres of 40 $\mu$ diameter and the latter had been drawn out whilst hot at the outlet of the spinner. Their resistance to breaking was 4.6 g/denier. The same process was used for the aminated mixture (A-B) and fibres of the same fineness were obtained, the breaking resistance of which was 4.3 g/denier. The fibres were passed into a bath of toluene and isopropanol (50-50 b.v.) in order to remove any amine which had not reacted. The operating conditions for deying fibres and washing after dyeing are the conditions described by the dye manufacturers for the use of their products. In this experiment, we used Erionyl brilliant blue EFRL, Geigy, a soluble nonionic dye of the "acid of good affinity" type.

In order to observe the penetration of the dye into the fibre, we made transverse cuts into these fibres and examined the sections under a microscope. We detected an even colouring fully to the cores of the fibres.

EXAMPLE 2

A polypropylene (A) with a melting index of 6 dg/mn was mixed dry with a maleic anhydride ethylene copolymer (B) with an anhydride percentage of 6.6 percent, in a ratio of 5.5 g per 100 g of polypropylene.

The copolymer had a melting index of 60 dg/mn. The dry mixture was homogenised in a slubbing machine, extruded and granulated, and the product obtained was homogeneous.

The amination was carried out by reacting N-amino-ethyl-piperazine with the granules of the mixture, using a solution of 100 g of aminoethyl-piperazine per litre of toluene at a temperature of 70°C. for 20 minutes. The unreacted aminoethyl-piperazine was removed by washing in pure toluene at 50°C., and the granules were then carefully dried.

The initial polypropylene, and also the mixture of polypropylene and aminated copolymer (B) were extruded into fibres of a diameter of 40 $\mu$ as in the previous Example. The breaking resistances of the fibres were respectively 4.6 and 4.25 g/denier. The amine which was not fixed was again washed by passing the fibres into a toluene bath before dyeing.

The dyeing treatment was carried out with the dye Geigy Red G, a soluble nonionic acid dye of strong affinity. The dyeing conditions are those prescribed by the dye manufacturers and used for dyeing wool, for instance: bath containing 1 percent of anhydrous sodium sulphate and 1 percent of 80 percent acetic acid. 20 ccs of dyeing bath were used per gram of fibre, and the quantity of dyestuff used was 5 percent b.w. of the fibre. The bath was maintained at 50°C. for 15 minutes and then slowly raised to boiling and maintained there for 45 minutes.

The fibre was washed in water, then by a soapy solution, and finally in acetone or methanol and eventually dried.

The dyed fibres were subjected to tests for checking the colour-fastness of the dye when exposed to sunlight. The number related to this instance was 5, the value established according to the blue scale (e.g., of AEPMDS). The colour-retention under washing is measured according to the Swiss ad hoc Commission standard, and, expressed as a value in relation to the grey scale, this value is 4.

EXAMPLE 3

9 percent of the ethylene/maleic anhydride copolymer (B) having a percentage of 6.6 percent anhydride was added to polypropylene (A), melting index 6 dg/mn. This copolymer had a melting index of 33 dg/mn. The copolymer had been extruded into fibres of 40 $\mu$ and these had been drawn out whilst hot at the discharge outlet, as above.

Amination of these fibres was effected by use of a solution of 100 g of tetrethylenepentamine per litre of toluene at a temperature of 50°C. for 10 minutes. The breaking load was 3.95 g/denier. The mechanical resistance of the fibre was not modified by the amination treatment.

By measuring the nitrogen content, it was found that the reaction involved the binding of 2 amine molecules per anhydride function. The excess amine not fixed to the fibre, and thus not used for dyeing, was washed out by toluene at 50°C.

The dyeing was carried out with a "2/1 metalliferous complex" dyestuff, Irgalane Red 4 GL, of the Geigy company.

The fixation of the dye on the fibre was measured, and found to be 12 mg per gram of the mixture. The resistance to light was evaluated at 6 on the blue scale and the resistance to washing was 5 on the grey scale.

Moreover, mixtures were made with percentages of ethylene/maleic anhydride of 3, 6 and 15 percent (instead of 9 percent) and the same series of tests were carried out. It was found that the fixation of the dye was proportional to the amount of copolymer maleic anhydride groups in the mixture.

EXAMPLE 4

The ethylene/maleic anhydride copolymer (B) which was used contained 9.7 percent of groups derived from the maleic anhydride. Its melting index was 5. It was introduced in a ratio of 6.5 g of copolymer per 100 g of polypropylene (A). The polypropylene used had a melting index of 18 dg/mn and its isotacticity content was 95 percent.

As in the previous examples, fibres of 40 $\mu$ diameter were extruded from both the initial polypropylene and the mixture. The fibres had, respectively, resistances of 4.0 and 4.1 g/denier. The fibre made with the mixture was treated with a solution of hexamethylenediamine in a concentration of 100 g per litre of toluene for 10 minutes at a temperature of 50°C. The amine which was not fixed was extracted by passing the product through a bath of pure toluene at 50°C. Dyeing was then carried out with Alizarin Orange S of the Société Francaise de Matières Colorantes, a soluble nonionic, anthraquinone acid dye, the quantity of the fixed dye being 11 mg/kg of fibre.

EXAMPLE 5

The ethylene/maleic anhydride copolymer (B) used contained 12.5 percent of groups derived from the maleic anhydride. Its melting index was 30 dg/mn.

It was mixed with a polypropylene (A) which had a melting index of 18 dg/mn in a proportion of 7 parts copolymer per 100 parts of polypropylene; the mixture obtained was extruded in fibres and these, drawn out whilst hot from the discharge outlet, had a resistance to breaking of 3.95 g/denier and a diameter of 40 $\mu$. They were aminated by passing through a bath of toluene at 50°C. containing 100 g/l of ethylenediamine.

Dyeing was carried out with Polar Blue RAWL of the Geigy company, a dye of the same type as used in Example 2. An even take-up of the dye was observed. The fixed weight was 17 mg/g of fibre.

Colour-fastness tests of the dye to light gave a value of 6 on the blue scale and the test for resistance to washing gave 2; the grey scale value was 5.

EXAMPLE 6

10 percent b.w. of an ethylene/maleic anhydride copolymer (B) was added to a polyethylene (A) with a density of 0.987 and a melting index of 5.6 dg/mn. The copolymer showed a melting index of 33 dg/mn had a percentage of 6.2 percent of maleic anhydride.

The mixture was extruded as above into fibres of 40 $\mu$ diameter. The amination treatment was carried out on the fibre in a bath at 25°C. The bath contained 10 g of tetrethylenepentamine per 100 ccs of toluene, the length of the treatment was 10 minutes, the breaking resistance was 3.3 g/denier for the fibres treated made from the mixture, whilst that of the fibres made solely of polyethylene was 3.7 g/denier.

After washing in toluene at 25°C. for 10 mns, the fibre was immersed in a dyeing bath containing Eriochrome Flavine A a nonionic dyestuff metallisable with subsequent chromatation) of the Geigy company and a dyed fibre of excellent quality was obtained.

EXAMPLE 7

7 percent b.w. of ethylene/maleic anhydride copolymer (B) was added to a polyethylene (A) with a density of 0.920 and a melting index of 1.7 dg/mn. The copolymer had a melting index of 15 dg/mn and a percentage of 7 percent maleic anhydride.

The mixture (A-B) was made in an internal mixer, then kneaded and extruded in a flat film on a "Chill Roll" machine. The film was then passed into a bath at 30°C. containing 10 g of diethylenetriamine per 100 ccs of toluene for 1 minute. The amine which was not fixed was extracted during a second passage through a bath of pure toluene at 30°C. The film was then dyed with Irgacete Red of the Geigy company, a nonionic plasto-soluble dyestuff, using the conditions prescribed by the manufacturers. The colour obtained was satisfactory.

EXAMPLE 8

10 percent b.w. of an ethylene/maleic anhydride copolymer (B) with a melting index of 5 dg/mn and containing 5 percent b.w. of anhydride groups was added to a polypropylene (A) with a melting index of 6 dg/mn.

The mixture (A-B) was homogenised by mixing in a slubber, and extruded into fibres, which were first drawn out whilst hot from the discharge outlet and then, after solidification at 150°C., in an extension ratio of 5/1 in an air-circulating tunnel. The diameter of the fibres thus prepared was about 20 $\mu$. The breaking resistance was 6.7 g/denier.

Amination (A-B) was then effected in an aqueous emulsion containing 10 percent b.v. of tetrethylenepentamine, 5 percent of 1,2,4-trichlorobenzene and 1 percent of surfactant (Sunaptol of FMC). The temperature of the treatment was 90°C. which was maintained for 20 mn. The excess amine was removed by passage through an aqueous emulsion of the trichlorobenzene and surfactant. The dyeing process was then carried out with the metalliferous dey Irgalane Red 4 GL of the Geigy company. In these conditions, the dye bath was fully absorbed.

EXAMPLE 9

10 percent b.w. of an ethylene/maleic anhydride copolymer (B) having a melting index of 5 dg/mn was added to a polypropylene (A) with a melting index of 18 dg/mn. The percentage of anhydride in the mixture (A-B) was 1 percent b.w. The mixture was slubbed and extruded into film which was cut into strips which were drawn out in an oven at 150°C. The drawing out was effected at a ratio of 8/1, and the resultant strips were then passed into a second oven at 130°C. in order to stabilise them. The thickness of these strips was approximately 20 $\mu$.

These strips (A-B) were then subjected to dyeing with the basic dye, after passing for 10 minutes through a bath of toluene at 50°C. The dye used was Rhodamine B of the Kuhlman company. The bath contained 5 percent b.w. of dye, 3 percent acetic acid and 2 percent b.w. ammonium sulphate in relation to the weight of the fibre. The dye ratio was 40 ccs per gram of fibre. A good fixation of the dye was obtained.

EXAMPLE 10

12.5 percent b.w. of an ethylene/maleic anhydride copolymer (B) with a melting index of 5 dg/mn and containing 5 percent b.w. of anhydride groups was added to a polypropylene (A). The mixture (A-B) was slubbed and then extruded into fibres 40 $\mu$ in diameter.

These fibres were aminated by treatment in an aqueous emulsion containing 10 percent b.v. of hydrazine, 5 percent trichlorobenzene and 1 percent surfactant (Sunaptol — FMC). The duration of the treatment was 20 minutes at 90°C. The excess nitrogen compound was removed by passage through a fresh emulsion of trichlorobenzene and surfactant.

The dye used was the metalliferous dye Irgalane Red 4 GL of Geigy.

A dye fibre of a very even colouring was obtained.

EXAMPLE 11

9 percent of a copolymer (B) of ethylene and maleic anhydride (E-AM), having a percentage of 10.5 percent of groups derived from the maleic anhydride, was added to a polypropylene (A) with a melting index of 6 dg/mn. The copolymer (B) had a melting index of 80 dg/mn.

The mixture was extruded in the form of fibres of 40 $\mu$ and these had drawn out whilst hot from the discharge outlet.

Amination of these fibres was made by steeping in a solution containing 100 g of tetrethylenepentamine per litre of toluene, at a temperature of 50°C. for 10 minutes.

The excess amine which was not fixed to the fibre, was washed out in a bath of pure toluene at 50°C. The fibre had fixed a quantity of amine corresponding to 1.4 percent nitrogen, which corresponds to the fixation of 2 molecules of amine per anhydride group initially present in the mixture.

The breaking strength of the treated fibre was 3.5 g/denier. It was noted that the mechanical resistance of the fibre had not been modified by the amination treatment.

EXAMPLE 12

10 percent b.w. of an ethylene/maleic anhydride copolymer was added to a polyethylene (A) of a density of 0.978 and with a melting index of 5.6 dg/mn. This copolymer had a melting index of 33 dg/mn and a maleic anhydride percentage of 6.2.

The mixture was extruded as above into fibres of 40 $\mu$ diameter. The amination treatment was carried out on the fibre in a bath at 25°C. The bath contained 10 g of tetrethylene-pentamine per 100 ccs of toluene, th length of treatment was 10 minutes and the breaking resistance was 3.3 g/d for the treated fibres formed from the mixture, whilst that of the fibres of polyethylene alone was 3.7 g/d.

After a 10-minute soaking in the toluene at ambient temperature, the fibre was dried and dyed by means of Eriochrome yellow A of Geigy, according to the operational method described.

The colouration obtained was constant and even and of good appearance in the mass as shown by the following results.

| Sunlight | Washing at 60°C. ISO No. 3 | Dry Cleaning | Friction | |
|---|---|---|---|---|
| | | | Dry | Damp |
| 6/8 | 5/5 | 5/5 | 5/5 | 5/5 |

EXAMPLE 13

10 percent b.w. of an ethylene/maleic anhydride copolymer (B), with a melting index of 5 dg/mn and containing 5 percent b.w. of anhydride, was added to a polypropylene (A) having a melting index of 6 dg/mn.

The mixture (A-B) was homogenised by mixing in a slubber, extruded into fibres and first drawn out whilst hot at the discharge outlet, then a second time after solidification at 150°C. at a drafting ratio of 5/1 in a circulating air tunnel. The diameter of the fibres thus prepared was about 20 $\mu$. The breaking resistance was 6.7 g/denier.

Amination (A-B) was then effected in an aqueous emulsion containing 10 percent b.v. of tetrethylenepentamine, 5 percent of 1,2,4-trichlorobenzene and 1 percent of surfactant (Sunaptol — FMC). The temperature of the treatment was 90°C., which was maintained for 20 minutes. The excess amine was removed by simple passage through an aqueous emulsion of the trichlorobenzene and surfactant.

The dyeing of this fibre was carried out with a complete take-up of the dyeing bath, by dyeing under pressure at 120° for 1 hour in an autoclave with 5 percent of Irgalane Red 4 GL in relation to the weight of the fibre. The stability results were as follows:

| Sunlight | Washing at 60°C. ISO No. 3 | Dry Cleaning | Friction Dry | Friction Wet |
|---|---|---|---|---|
| 6/8 | 5/5 | 4 at 5/5 | 5/5 | 5/5 |

The washing, drying and friction tests were repeated three times, and the value of 5/5 was always obtained.

This fibre was treated in boiling xylene in a Kumagawa extractor for 24 hours. The insoluble part recovered retained all the dye and represented 10 percent of the initial weight of the original fibre, thus denoting considerable cross-linking of the copolymer incorporated in the polypropylene. The insoluble part retained the form of filaments and had a good cohesion, thereby showing satisfactory dispersion of the copolymer in the polypropylene.

EXAMPLE 14

Identical fibres to those prepared in Example 13 were aminated in an autoclave using an aqueous emulsion comprising 5 litre of tetrethylenepentamine, 5 g per litre of 1,2,4-trichlorobenzene and 0.1 g per litre of surfactant of the polyoxyethylene-lauryl ether group. The fibres were immersed in this bath at 95°C. and then, after closing the autoclave, the temperature was brought to 120°C. for 30 minutes. After cooling, the fibres were simply washed with hot water.

Dyeing was effected in an autoclave with the fibres being introduced at 50°C. and the temperature was steadily increased to 120°C., which was then maintained for 1 hour.

The test, carried out with 3 percent of Irgalane 5R Dark Brown (Geigy), in relation to the weight of the fibres, led to a good dyeing result, an excellent even colouring and good stability.

| Sunlight | Washing at 60°C. ISO No. 3 | Dry Cleaning | Friction Dry | Friction Wet |
|---|---|---|---|---|
| 6/8 | 5/5 | 4 at 5/5 | 5/5 | 5/5 |

EXAMPLE 15

Comparative experiments carried out after amination in an emulsion as in Example 13, with a primary amine, such as butylamine, led to a very poor colouring result with acid wool dyes. The use of a diamine whose one amine function is primary and the other is tertiary, like N,N-dimethylethylenediamine, resulted in a very intense adsorption of colour.

The following polyamines which only have one primary amine function, 2-amino-pyridine, aminoethylpiperazine, 3-amino-1,2,4-triazole and 2-aminobenzothioazole, behave in the same way. On the other hand, polyamines having at least 2 primary amine functions provide superior dyeing affinities increasing in the following order: a polyethylene-imine of molecular weight of 40,000, ethylenediamine, diethylenetriamine, triethylenetetramine, tetrethylenepentamine.

The use of the following dyes of various kinds led to the same observations: Irgalance Red 4 GL, Inochrome Blue 2 J, Eriochrome yellow GS, Erionyl Red RL.

EXAMPLE 16

3 percent of a copolymer containing 5.65 percent b.w. of maleic anhydride and having a melting index equal to 87, was added to a polypropylene with a melting index of 6 dg/mn.

In the course of mixing the two polymers in a Banbury mixer, 0.75 percent tetrethylenepentamine was added. The mixture was extruded into filaments which were drawn out at a ratio of 5. The resistance of these fibres was 6.3 g/denier for an elongation of 36 percent.

After swelling for 10 min in an aqueous emulsion containing 10 g/litre of 1,2,4-trichlorobenzene at 95° with a bath ratio of 30, the fibre was dyed by 1 percent of Setacyl Blue P 4 GS of Geigy. The colouring obtained was uniform and had the following properties:

| Sunlight | Washing at 60°C. ISO No. 3 | Dry Cleaning | Friction Dry | Friction Wet |
|---|---|---|---|---|
| 5/8 to 6/8 | 4/5 to 5/5 | 4/5 to 5/5 | 5/5 | 4/5 to 5/5 |

EXAMPLE 17

10 percent of a copolymer B of ethylene and maleic anhydride containing 10.5 percent b.w. of the anhydride and having a flow index of 80 dg/mn were added to a polypropylene A with a melting index of 6 dg/mn.

The mixture A-B was extruded into fibres which were drawn out from the discharge outlet into an oven at 150°, at a ratio of 6/1.

The fibres soaked for 5 seconds in a solution of 100 g/litre of tetrethylenepentamine in 1,2,4-trichlorobenzene at a temperature of 50°C. The fibres were then dried and passed into a drying room under nitrogen for 10 mm at 100°C., and finally washed in an aqueous solution at pH 5.

Dyeing was carried out with Erionyl Red RL according to the operative method described, in an agitated autoclave at 120°–125° for 1 hour. Thus a colouring was obtained which had a very good affinity and good stability.

| Sunlight | Washing at 60°C. ISO No. 3 | Dry Cleaning | Friction Dry | Friction Wet |
|---|---|---|---|---|
| 6/8 | 5/5 | 4/5 to 5/5 | 5/5 | 5/5 |

We claim:

1. A polymer composition capable of absorbing dyestuffs, which comprises at least one crystalline or semi-crystalline polyolefin and 2 to 15 percent, by weight of the polyolefin, of a statistical copolymer of ethylene and maleic anhydride having a grade according to ASTM Test 1238–65T in the range from 1 to 1,000 dg/min and containing from 0.1 to 1.5 percent by weight of the polyolefin and the copolymer of ethylene and maleic anhydride of anhydride groups derived from the maleic anhydride copolymerised with ethylene.

2. A composition according to claim 1, in which the statistical copolymer contains 0.5 to 1.0 percent by weight of the polyolefin and the copolymer of ethylene and maleic anhydride of anhydride groups derived from the aleic anhydride copolymerised with ethylene.

3. A composition according to claim 1, which has been subjected to amination with at least one polyamine having at least one primary amine group.

4. A composition according to claim 3, which has been aminated with a polyamine having two primary amine groups.

5. A composition according to claim 3, in which the maleic anhydride content is less than 0.2 percent by weight of the polyolefin and the copolymer.

6. A shaped article prepared from a polymer composition according to claim 1, which has been dyed with an anionic reactive dyestuff.

7. A process for the preparation of a polyolefin composition which can be readily and uniformly dyed, which comprises treating a statistical copolymer of ethylene and maleic anhydride, having a grade according to ASTM Test 1238–65T of 1 to 1,000 dg/min and containing 0.1 to 1.5 percent by weight of the polyolefin and the copolymer of ethylene and maleic anhydride of anhydride groups derived from the maleic anhydride copolymerised with ethylene, with a polyamine having at least one primary amine group, and then admixing the treated copolymer with a crystalline or semi-crystalline polyolefin.

8. A process for the preparation of a polyolefin composition, which comprises admixing a crystalline or semi-crystalline polyolefin with a statistical copolymer of ethylene and maleic anhydride, having a grade according to ASTM Test 1238–65T of 1 to 1,000 dg/min and containing 0.1 to 1.5 percent by weight of the polyolefin and the copolymer of ethylene and maleic anhydride of anhydride groups derived from the anhydride and subjecting the resultant composition to amination of the copolymer with a polyamine having at least one primary amine group.

9. A process according to claim 8, in which the amination is carried out by steeping a finished or semi-finished article of the polymer composition in a solution of the amine in a swelling solvent for the polyolefin.

10. A process according to claim 7, in which a polyamine having two primary amine groups is used.

11. A process according to claim 8 in which a polyamine having two primary amine groups is used.

12. A process according to claim 9 in which a polyamine having two primary amine groups is used.

13. A composition according to claim 2, which has been subjected to amination with at least one polyamine having at least one primary amine group.

14. A composition according to claim 4, in which the maleic anhydride content is less than 0.2 percent by weight of the polyolefin and the copolymer.

* * * * *